US012670560B2

(12) United States Patent
Tochibori et al.

(10) Patent No.: US 12,670,560 B2
(45) Date of Patent: Jun. 30, 2026

(54) MEDICAL IMAGE PROCESSING APPARATUS, MAGNETIC RESONANCE IMAGING APPARATUS, AND MEDICAL IMAGE PROCESSING METHOD

(71) Applicant: Canon Kabushiki Kaisha, Tokyo (JP)

(72) Inventors: Hana Tochibori, Yokohama (JP); Shun Uematsu, Nasushiobara (JP); Hideaki Kutsuna, Kawasaki (JP); Kensuke Shinoda, Otawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 18/611,793

(22) Filed: Mar. 21, 2024

(65) Prior Publication Data

US 2024/0331109 A1     Oct. 3, 2024

(30) Foreign Application Priority Data

Mar. 31, 2023   (JP) ................................. 2023-058627
Mar. 4, 2024    (JP) ................................. 2024-031884

(51) Int. Cl.
  *G06T 5/70*      (2024.01)
  *G06T 5/20*      (2006.01)
  *G06T 7/11*      (2017.01)

(52) U.S. Cl.
  CPC .................. *G06T 5/70* (2024.01); *G06T 5/20* (2013.01); *G06T 7/11* (2017.01); *G06T 2207/10088* (2013.01); *G06T 2207/20056* (2013.01); *G06T 2207/20132* (2013.01); *G06T 2207/30004* (2013.01)

(58) Field of Classification Search
None
See application file for complete search history.

(56) References Cited

U.S. PATENT DOCUMENTS

| | | | | |
|---|---|---|---|---|
| 11,119,313 B1 * | 9/2021 | Ollila | ................. | G02B 27/0093 |
| 11,694,335 B2 * | 7/2023 | Mahadik | .............. | G06T 7/0012 |
| | | | | 382/128 |
| 12,541,850 B2 * | 2/2026 | Huet | .................... | G06T 7/0012 |

(Continued)

FOREIGN PATENT DOCUMENTS

JP        2020-201823 A     12/2020

*Primary Examiner* — Randolph I Chu
(74) *Attorney, Agent, or Firm* — Oblon, McClelland, Maier & Neustadt, L.L.P.

(57) ABSTRACT

A medical image processing apparatus according to one embodiment includes processing circuitry. The processing circuitry obtains input medical image data having a larger image region than that of output medical image data resulting from image processing; generates first intermediate image data by extracting from the input medical image data an image region including a region in the output medical image data and being smaller than the input medical image data; performs first image processing to the first intermediate image data, generates second intermediate image data based on the first intermediate image data having undergone the first image processing and on image data, of the input medical image data, containing an outside of an image region corresponding to the first intermediate image data; and converts the second intermediate image data to k-space data, and converts the k-space data having undergone k-spatial processing to the output medical image data.

8 Claims, 8 Drawing Sheets

(56) References Cited

U.S. PATENT DOCUMENTS

| | | | | |
|---|---|---|---|---|
| 2015/0276909 A1* | 10/2015 | Kawaji | .............. | G01R 33/5673 |
| | | | | 600/416 |
| 2020/0184640 A1* | 6/2020 | Mahadik | ................... | G06T 1/20 |
| 2020/0396415 A1* | 12/2020 | Kokura | .................... | G06N 3/08 |
| 2022/0155395 A1* | 5/2022 | Johnson | ............. | G01R 33/4818 |
| 2022/0183582 A1* | 6/2022 | Kutsuna | ................. | A61B 5/055 |
| 2024/0241201 A1* | 7/2024 | Park | ..................... | G01R 33/543 |
| 2024/0331109 A1* | 10/2024 | Tochibori | ................. | G06T 7/11 |
| 2024/0394871 A1* | 11/2024 | Zhang | ....................... | G06T 7/11 |

* cited by examiner

FIG.4

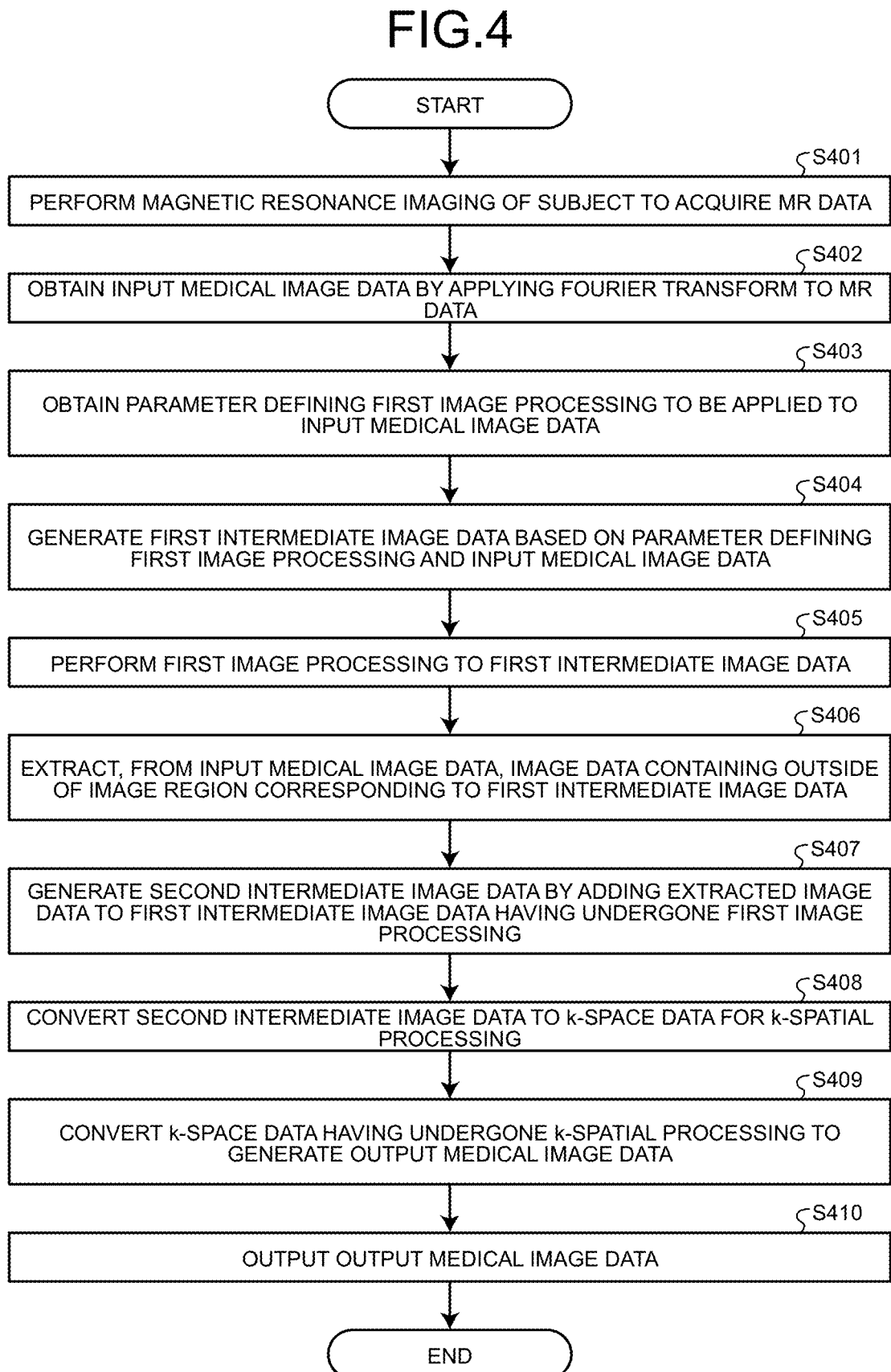

START

S401
PERFORM MAGNETIC RESONANCE IMAGING OF SUBJECT TO ACQUIRE MR DATA

S402
OBTAIN INPUT MEDICAL IMAGE DATA BY APPLYING FOURIER TRANSFORM TO MR DATA

S403
OBTAIN PARAMETER DEFINING FIRST IMAGE PROCESSING TO BE APPLIED TO INPUT MEDICAL IMAGE DATA

S404
GENERATE FIRST INTERMEDIATE IMAGE DATA BASED ON PARAMETER DEFINING FIRST IMAGE PROCESSING AND INPUT MEDICAL IMAGE DATA

S405
PERFORM FIRST IMAGE PROCESSING TO FIRST INTERMEDIATE IMAGE DATA

S406
EXTRACT, FROM INPUT MEDICAL IMAGE DATA, IMAGE DATA CONTAINING OUTSIDE OF IMAGE REGION CORRESPONDING TO FIRST INTERMEDIATE IMAGE DATA

S407
GENERATE SECOND INTERMEDIATE IMAGE DATA BY ADDING EXTRACTED IMAGE DATA TO FIRST INTERMEDIATE IMAGE DATA HAVING UNDERGONE FIRST IMAGE PROCESSING

S408
CONVERT SECOND INTERMEDIATE IMAGE DATA TO k-SPACE DATA FOR k-SPATIAL PROCESSING

S409
CONVERT k-SPACE DATA HAVING UNDERGONE k-SPATIAL PROCESSING TO GENERATE OUTPUT MEDICAL IMAGE DATA

S410
OUTPUT OUTPUT MEDICAL IMAGE DATA

END

FIG.5

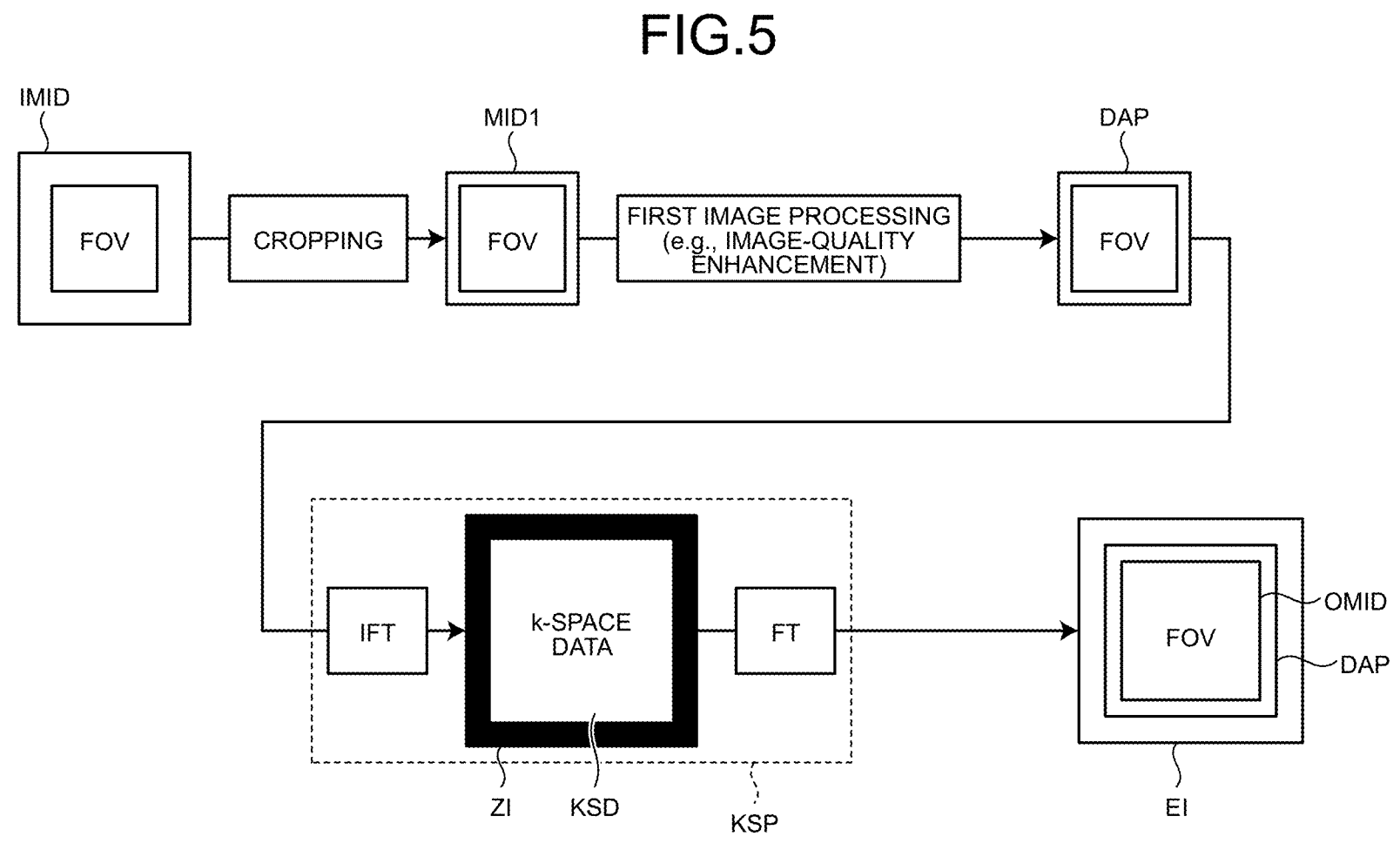

IMID

FOV

CROPPING

MID1

FOV

FIRST IMAGE PROCESSING
(e.g., IMAGE-QUALITY
ENHANCEMENT)

DAP

FOV

IFT

ZI

KSD k-SPACE
DATA

KSP

FT

OMID

DAP

FOV

EI

MEDICAL IMAGE PROCESSING APPARATUS, MAGNETIC RESONANCE IMAGING APPARATUS, AND MEDICAL IMAGE PROCESSING METHOD

CROSS-REFERENCE TO RELATED APPLICATIONS

This application is based upon and claims the benefit of priority from Japanese Patent Application No. 2023-058627, filed on Mar. 31, 2023; and Japanese Patent Application No. 2024-031884, filed on Mar. 4, 2024, the entire contents of both of which are incorporated herein by reference.

FIELD

Embodiments described herein relate generally to a medical image processing apparatus, a magnetic resonance imaging apparatus, and a medical image processing method.

BACKGROUND

Conventionally, magnetic resonance imaging apparatuses may image a wider region than the field of view of a final image to be output (hereinafter, referred to as a final output image) in view of reducing wraparound artifacts, for example. In this regard, a conventional approach is that considering influences on the image quality of final output images, all the data across the wider region is subject to heavy-load, time-consuming image processing such as super-resolution processing. Because of this, it may take a large amount of time to obtain final output images in such a conventional manner.

BRIEF DESCRIPTION OF THE DRAWINGS

FIG. 4 is a flowchart illustrating steps of image processing according to an embodiment by way of example;

FIG. 5 illustrates an example of an outline of image processing according to a first comparison relative to an embodiment;

DETAILED DESCRIPTION

According to one embodiment, a medical image processing apparatus includes processing circuitry. The processing circuitry obtains input medical image data having a larger image region than an image region of output medical image data resulting from image processing. The processing circuitry generates first intermediate image data by extracting from the input medical image data an image region including a region in the output medical image data and being smaller than the input medical image data. The processing circuitry performs first image processing to the first intermediate image data. The processing circuitry generates second intermediate image data based on the first intermediate image data having undergone the first image processing and on image data, of the input medical image data, containing an outside of an image region corresponding to the first intermediate image data. The processing circuitry converts the second intermediate image data to k-space data, and converts the k-space data having undergone k-spatial processing to the output medical image data.

Hereinafter, embodiments of a medical image processing apparatus, a magnetic resonance imaging (MRI) apparatus, and a medical image processing method will be described in detail with reference the accompanying drawings.

Figure 1:
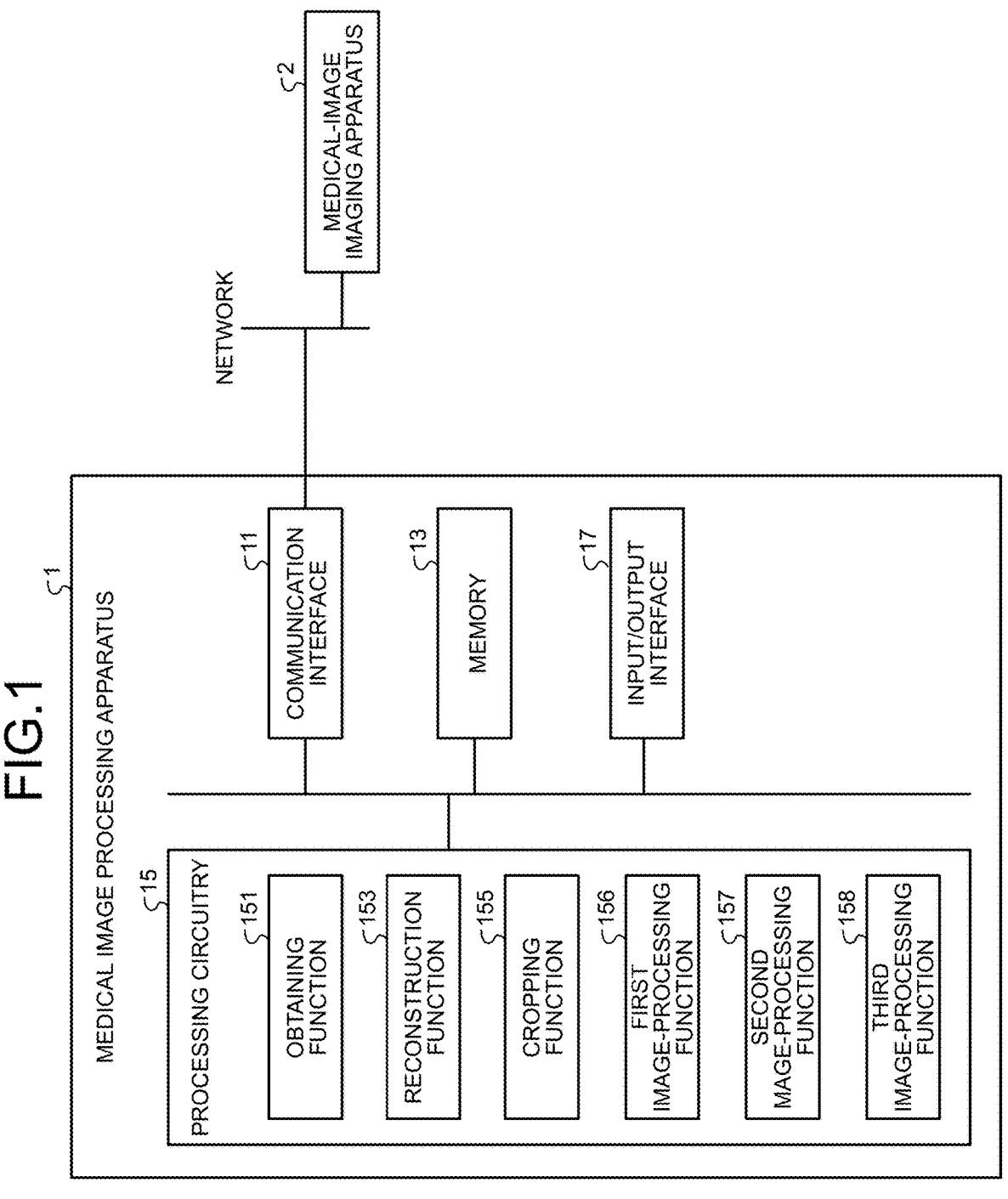
FIG. 1 is a block diagram illustrating an exemplary medical image processing apparatus according to an embodiment.

FIG. 1 is a block diagram illustrating an example of a medical image processing apparatus 1. The medical image processing apparatus 1 may be incorporated in, for example, any of various kinds of modalities capable of generating medical images or in an in-hospital server. The medical image processing apparatus 1 includes various functions, which may be incorporated in a picture archiving and communication systems (PACS) server or a hospital information system (HIS) server, for example. In such a case the medical image processing apparatus 1 is connected via a network to any suitable medical-image imaging apparatus 2 that can perform magnetic resonance imaging. The medical-image imaging apparatus 2 corresponds to, for example, a known MRI apparatus.

The medical image processing apparatus 1 including the various functions is exemplified by an MRI apparatus, a positron emission tomography (PET)-MRI apparatus, and a single photon emission computed tomography (SPECT)-MRI apparatus. In the following the medical image processing apparatus 1 is defined to be included in an MRI apparatus for the sake of specificity. Such an MRI apparatus includes various kinds of functions of processing circuitry 15.

Embodiment

Figure 2:
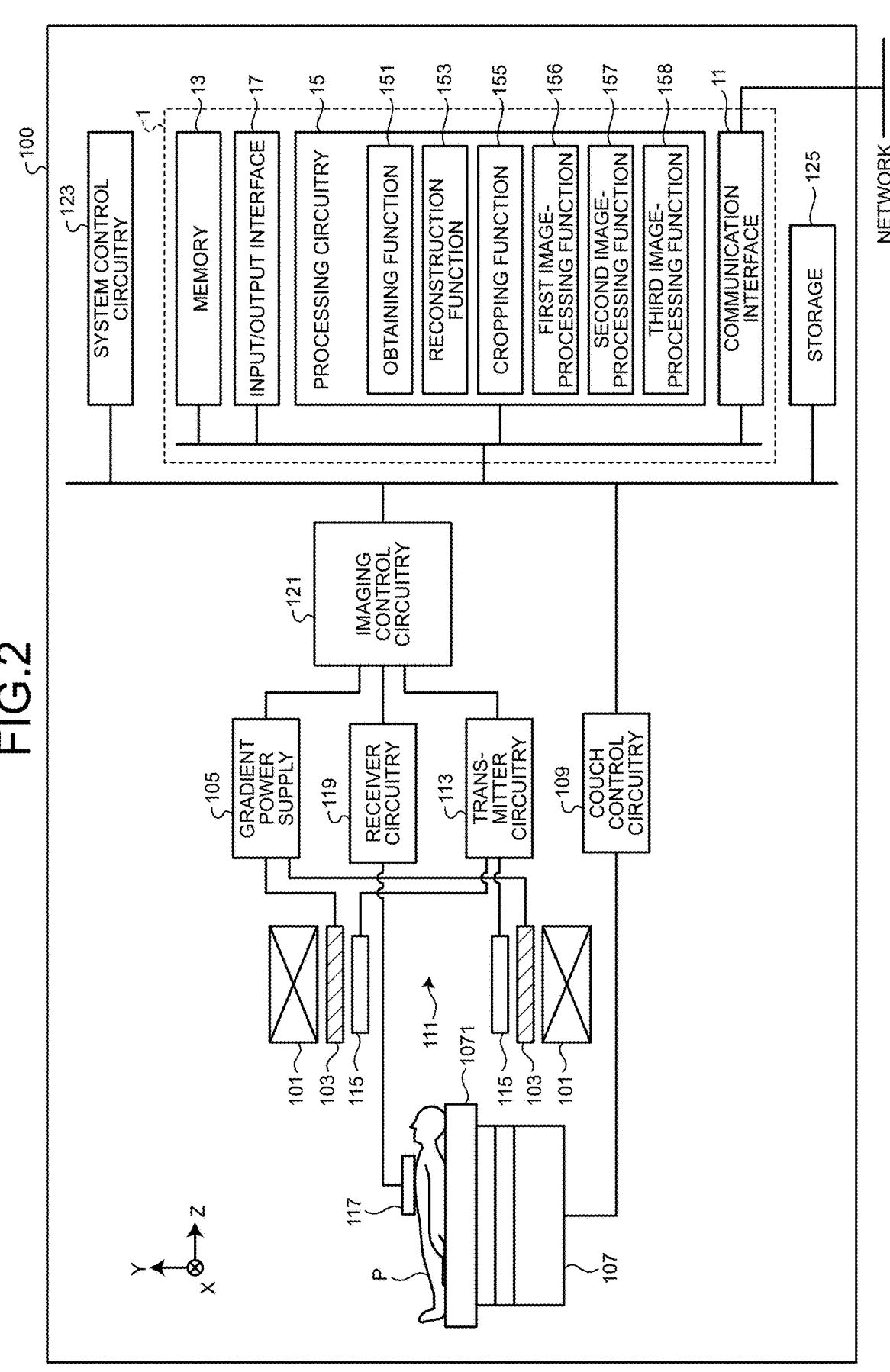
FIG. 2 illustrates an MRI apparatus according to an embodiment by way of example.

FIG. 2 illustrates an MRI apparatus 100 according to the present embodiment by way of example. In the MRI apparatus 100 as illustrated in FIG. 2, the medical image processing apparatus 1 further includes an input/output interface 17. However, the medical image processing apparatus 1 may not incorporate the input/output interface 17, as illustrated in FIG. 1. As illustrated in FIG. 2, the MRI apparatus 100 includes magnetostatic magnets 101, gradient coils 103, a gradient power supply 105, a couch 107, couch control circuitry (system control unit) 109, transmitter circuitry 113, a transmission coil 115, a reception coil 117, receiver circuitry 119, imaging control circuitry (imaging unit) 121, system control circuitry (system control unit) 123, a storage 125, and the medical image processing apparatus 1.

The magnetostatic magnets 101 are hollow, substantially cylindrical magnets. The magnetostatic magnets 101 generate substantially uniform magnetostatic fields in the internal space. Examples of the magnetostatic magnet 101 include a superconductive magnet.

The gradient coils 103 are hollow, substantially cylindrical coils and are disposed inside a cylindrical cooling container. The gradient coils 103 are individually supplied with currents to generate gradient magnetic fields which vary in magnetic strength along mutually orthogonal axes X, Y, and Z. The X, Y, and Z-axial gradient magnetic fields generated by the gradient coils 103 serve as, for example, a slice-selective gradient magnetic field, a phase-encoding gradient magnetic field, and a frequency-encoding gradient magnetic field (also referred to as readout gradient magnetic field). The slice-selective gradient magnetic field is used for optionally determining an imaging view. The phase-encoding gradient magnetic field is used for changing a magnetic resonance (MR) signal in phase in accordance with a spatial position. The frequency-encoding gradient magnetic field is used for varying the MR signal in frequency in accordance with a spatial position.

The gradient power supply 105 is a power supply unit that supplies currents to the gradient coils 103 under the control of the imaging control circuitry 121.

The couch 107 includes a couchtop 1071 on which a subject P is to be laid. Under the control of the couch control circuitry 109, the couch 107 inserts the couchtop 1071 on which the subject P is lying into a bore 111.

The couch control circuitry 109 serves to control the couch 107. The couch control circuitry 109 drives the couch 107 in response to an operator's instruction given via the input/output interface 17 to move the couchtop 1071 longitudinally and vertically, and horizontally in some situation.

The transmitter circuitry 113 supplies high frequency pulses modified with the Larmor frequency to the transmission coils 115 under the control of the imaging control circuitry 121. The transmitter circuitry 113 includes, for example, an oscillator, a phase selector, a frequency converter, an amplitude modifier, and a radio frequency (RF) amplifier. The oscillator generates RF pulses at a resonance frequency specific to target atomic nuclei in the magneto-static field. The phase selector selects the phase of the RF pulses generated by the oscillator. The frequency converter converts the frequency of the RF pulses output from the phase selector. The amplitude modifier modifies the frequency of the RF pulses output from the frequency converter by, for example, a sine function. The RF amplifier amplifies the RF pulses output from the amplitude modifier for supply to the transmission coils 115.

The transmission coils 115 are RF coils located inside the gradient coils 103. The transmission coils 115 generate RF pulses which correspond to a high-frequency magnetic field, in accordance with an output from the transmitter circuitry 113.

The reception coil 117 is an RF coil located in-between the gradient coils 103. The reception coil 117 receives MR signals radiated from the subject P due to a high frequency magnetic field. The reception coil 117 outputs the MR signals to the receiver circuitry 119 upon receipt. The reception coil 117 is, for example, a coil array including one or more, or typically two or more coil elements. In the following, the reception coil 117 is defined as a coil array including two or more coils for the sake of specificity.

The reception coil 117 may be composed of a single coil element. Although the transmission coils 115 and the reception coil 117 are depicted as independent RF coils in FIG. 2, the transmission coil 115 and the reception coil 117 may be united into one coil as a transmission/reception coil. The transmission/reception coil is, for example, a local transmission/reception RF coil adapted to a region of the subject P to be imaged, such as a head coil.

The receiver circuitry 119 generates digital MR signals (hereinafter, MR data) from the MR signals output from the reception coil 117 under the control of the imaging control circuitry 121. Specifically, the receiver circuitry 119 subjects the MR signals output from the reception coil 117 to various kinds of signal processing, and then performs analog to digital (A/D) conversion to the resultant MR signals to generate MR data. The receiver circuitry 119 transmits the MR data to the imaging control circuitry 121. For example, the MR data is generated for each of the coil elements and output to the imaging control circuitry 121 together with identification tags for the respective coil elements.

The imaging control circuitry 121 acquires the MR data by magnetic resonance imaging of the subject P. Specifically, the imaging control circuitry 121 controls the gradient power supply 105, the transmitter circuitry 113, and the receiver circuitry 119 in accordance with an imaging protocol output from the processing circuitry 15, to perform imaging of the subject P. The imaging protocol includes a pulse sequence depending on an examination type. The imaging protocol defines a magnitude of current to be supplied from the gradient power supply 105 to the gradient coils 103, current supply timing from the gradient power supply 105 to the gradient coils 103, a magnitude and a period of a high frequency pulse to be supplied from the transmitter circuitry 113 to the transmission coil 115, high-frequency pulse supply timing from the transmitter circuitry 113 to the transmission coil 115, and timing at which the reception coil 117 receives the MR signals, for example. The imaging control circuitry 121 drives the gradient power supply 105, the transmitter circuitry 113, and the receiver circuitry 119 to image the subject P, receives resultant MR data from the receiver circuitry 119, and transfers the MR data to the medical image processing apparatus 1. The imaging control circuitry 121 corresponds to an imaging unit.

In the following description, "processor or processors" will retrieve and execute computer programs corresponding to the various functions from a memory 13 as an example. However, it is not intended to limit the present embodiment to such an example. The term, "processor" used herein refers to, for example, circuitry such as a CPU, a graphical processing unit (GPU), an application specific unitary circuit (ASIC), a programmable logic device (e.g., simple programmable logic device (SPLD)), a complex programmable logic device (CPLD), and a field programmable gate array (FPGA).

In the case of the processor being a CPU, for example, the processor implements the functions by retrieving and executing the computer programs from the memory 13. In the case of the processor being an ASIC, the computer programs are not stored in the memory 13, instead, the functions are directly embedded in the circuitry of the processor as a logic circuit. According to the present embodiment, each processor may be configured as a single circuit, or multiple independent circuits may be combined into a single processor to implement the functions. Further, an example that a single memory circuit stores the computer programs corresponding to the processing functions will be explained below. Alternatively, multiple memory circuits may be disposed in a distributed manner, allowing the processing circuitry 15 to retrieve the corresponding computer programs from the individual memory circuits.

The system control circuitry 123 includes, as hardware resources, a processor (not shown) and memory such as read-only memory (ROM) and random access memory (RAM), and includes a system control function to control the MRI apparatus 100. Specifically, the system control circuitry 123 retrieves and loads a system control program from the storage 125 onto the memory to control the respective circuits of the MRI apparatus 100 according to the loaded system control program.

For example, the system control circuitry 123 retrieves an imaging protocol from the storage 125 according to an imaging condition input by the operator via the input/output interface 17. The system control circuitry 123 transmits the imaging protocol to the imaging control circuitry 121 to perform control over imaging of the subject P. The system control circuitry 123 may be implemented by, for example, a processor. Alternatively, the system control circuitry 123 may be incorporated in the processing circuitry 15. In this case the processing circuitry 15 performs the system control function and functions as a substitute for the system control circuitry 123.

The storage 125 stores therein a variety of computer programs to be executed by the system control circuitry 123, a variety of imaging protocols, and imaging conditions including imaging parameters that define the imaging protocols, for example. The storage 125 is, for example, a semiconductor memory device as RAM or flash memory, a hard disk drive (HDD), a solid state drive (SSD), or an optical disc. Alternatively, the storage 125 can be a driver that reads and writes various kinds of information from and to portable storage media such as a compact disc (CD)-ROM drive, a digital versatile disk (DVD) drive, and a flash memory, for example. The memory 13, rather than the storage 125, may store the various kinds of data and function as a substitute for the storage 125.

The medical image processing apparatus 1 includes a communication interface 11, the memory 13, and the processing circuitry 15. As illustrated in FIG. 1 and FIG. 2, the communication interface 11, the memory 13, and the processing circuitry 15 are electrically connected to one another via a bus in the medical image processing apparatus 1. As illustrated in FIG. 1 and FIG. 2, the medical image processing apparatus 1 is connected to a network via the communication interface 11. The network can be communicably connected to, for example, various modalities and information processing systems in a medical facility, such as a HIS and a radiology information system (RIS). The medical image processing apparatus 1 of FIG. 1 may additionally include an input interface for allowing the operator to input various instructions and a display (output interface) that displays medical images generated by a third image-processing function 158, or the input/output interface 17 of FIG. 2.

The communication interface 11 performs data communications with, for example, a variety of modalities that image the subject P for a medical examination, a HIS, and a PACS. The communication standard under which the communication interface 11, and the modalities and the HIS mutually communicate may be any suitable standard. Examples of the communication standard include both or either of Health Level 7 (HL7) and Digital Imaging and Communications in Medicine (DICOM).

The memory 13 can be implemented by memory circuitry that stores various kinds of information therein. The memory 13 is, for example, a storage device such as an HDD, an SSD, and an integrated circuit storage. The memory 13 corresponds to a storage unit. In addition to an HDD and an SSD, the memory 13 may be a semiconductor memory device as a RAM or a flash memory, an optical disc as a compact disc (CD) or a digital versatile disk (DVD), a portable storage medium, or a driver that reads and writes various kinds of information from and to a semiconductor memory device as a RAM, for example.

The memory 13 stores an obtaining function 151, a reconstruction function 153, a cropping function 155, a first image-processing function 156, a second image-processing function 157, and a third image-processing function 158 in a computer-executable program format, each of which the processing circuitry 15 implements. The memory 13 also stores therein various kinds of data received by the obtaining function 151 via the communication interface 11. Specifically, the memory 13 stores, for example, the MR data obtained by the obtaining function 151 from the imaging control circuitry 121 or the medical-image imaging apparatus 2. The memory 13 further stores magnetic resonance (MR) images generated by the reconstruction function 153. If the medical image processing apparatus 1 is implemented by any kind of image server, the memory 13 stores medical images obtained by the obtaining function 151.

The memory 13 further stores first intermediate image data generated by the cropping function 155 and image data, of input medical image data, containing an outside of an image region corresponding to the first intermediate image data. The input medical image data is, for example, image data including a larger image region than that of output medical image data resulting from image processing and to be subjected to cropping by the cropping function 155, as described later. The cropping function 155 generates the first intermediate image data from medical image data or input medical image data which is to undergo later-described first image processing. The cropping function 155 generates, from the input medical image data, the image data containing the outside of the image region corresponding to the first intermediate image data. The first intermediate image data and the image data of the input medical image data containing the outside of the image region corresponding to the first intermediate image data will be explained later.

The memory 13 further stores computer programs for various kinds of image processing (e.g., the first image processing) to be executed by the first image-processing function 156, application software, trained models, and else. The memory 13 also stores computer programs for second image processing to be executed by the second image-processing function 157 and application software. The memory 13 also stores computer programs for k-spatial processing to be executed by the third image-processing function 158 and application software. Examples of images to be subject to the first image processing and the k-spatial processing include MR images generated by the reconstruction function 153 and/or medical images obtained by the obtaining function 151. The first intermediate image data is medical image data to be input to the first image processing. The image data having undergone the first image processing and the image data of the input medical image data containing the outside of the image region corresponding to the first intermediate image data are image data to be subject to second image processing. The second intermediate image data is medical image data to be input to the k-spatial processing. Hereinafter, for the sake of specificity, medical image data having undergone the k-spatial processing, i.e., image data for display, will be referred to as output medical image data. The first image processing, the second image processing, the k-spatial processing, and the second intermediate image data will be explained below.

In the present embodiment, the input medical image data has a larger image region than that of the output medical image data resulting from the image processing to the input medical image data. The image region in the output medical image data is preset according to a user instruction given via the input/output interface 17, for example. The image region in the output medical image data set by the user corresponds to a field of view (FOV). Thus, the image region of the input medical image data is larger in size than the FOV. In other words, the image region of the input medical image data includes the FOV. The first intermediate image data includes a region which may affect the image quality of an image region in image data resulting from the first image processing applied to the entire region of the input medical image data. In other words, the first intermediate image data can be defined as image data excluding an image region which may have no or little influence on the image quality irrespective of the first image processing applied to the entire image region of the input medical image data. For example, the first intermediate image data includes a region containing the FOV and being larger than the FOV and an image region smaller than the input medical image data.

The first image processing includes, for example, at least either of a distortion correction process that corrects image distortions in the first intermediate image data and an image-quality enhancement process that enhances the first intermediate data in image quality. With respect to the first intermediate image data being an MR image, the distortion correction process corrects image distortions arising from a distortion of a gradient field, in the MR image. Such first image processing may be heavy-load processing that requires a large amount of processing time for computations. The specifics of the first image processing are, for example, characterized by a parameter defining the first image processing. The distortion correction process may also be referred to as a gradient distortion correction (GDC). The distortion correction process may be any other suitable process in addition to the GDC.

The memory 13 contains, for example, a GDC lookup table listing image distortions in the input medical image data relative to the image region (FOV) in the output medical image data. At the time of shipment, installment, and/or maintenance of the MRI apparatus 100, for example, a lookup table showing image distortions arising from a gradient distortion between the image region (FOV) in the output medical image data and the image region in the input medical image data may be generated. This lookup table represents, by coordinates, multiple positions (e.g., pixels) in the image region (FOV) of the output medical image data and their corresponding positions in the image region of the input medical image data, for example. The memory 13 stores such a lookup table.

The GDC corrects image distortions in the first intermediate image data based on image distortions in the input medical image data relative to the image region in the output medical image data. Thus, the parameter defining the distortion correction process corresponds to the lookup table showing the image distortions in the input medical image data with respect to the image region in the output medical image data. With reference to the image distortion lookup table, the GDC corrects the image distortions in the first intermediate image data to generate medical image data having undergone the first image processing (hereinafter, referred to as processed data) for output.

The image-quality enhancement process includes, for example, at least one of a noise reduction process for reducing noise in the first intermediate image data and an artifact reduction process for reducing artifacts in the first intermediate image data. The noise reduction process can be implemented by, for example, a trained model capable of noise reduction in the first intermediate image data (hereinafter, referred to as a noise reduction model) or a noise reduction filter capable of noise reduction in the first intermediate image data. In the noise reduction process, the noise reduction model or the noise reduction filter is applied to the input medical image data to generate first intermediate image data with less noise for output.

The artifact reduction process can be implemented by, for example, a trained model capable of artifact reduction in the first intermediate image data (hereinafter, referred to as an artifact reduction model). Examples of artifacts reducible by the artifact reduction model include Gibbs artifacts. Gibbs artifacts may also be referred to as truncation artifacts or ringing artifacts.

The trained model serving as the noise reduction model and the artifact reduction model can be implemented by, for example, a model utilizing a pre-trained neural network by a deep neural network (DNN). Application of the trained model is exemplified by a convolutional neural network (CNN). The CNN may include, for example, at least one convolutional filter, an input layer, multiple convolutional layers, and an output layer. The convolutional filter corresponds to a convolution kernel. Different convolutional filters include different kernels in size. Any known noise reduction model and artifact reduction model are applicable, therefore, a description thereof is omitted herein.

The noise reduction filter can be implemented by known filtering using a smoothing filter, a Gaussian filter, or an edge enhancement filter. The noise reduction filter includes a kernel called a weight matrix. Any known noise reduction filter is applicable, therefore, a description thereof is omitted herein.

As described above, the image-quality enhancement process is to improve the quality of the image in the first intermediate image data by using any of various kinds of kernels. The parameter defining the image-quality enhancement process corresponds to a kernel size for use in the image-quality enhancement process, for example. To implement the image-quality enhancement process by a trained model as a CNN, the parameter defining the image-quality enhancement process may include the total number of convolution layers in addition to a kernel size for use in the image-quality enhancement process. As such, the image-quality enhancement process can enhance the image quality of the first intermediate image data using the kernel related to the image-quality enhancement process to generate and output the output medical image data.

The second image processing differs from the first image processing. The second image processing is to combine the processed data and the image data of the input medical image data containing an outside of the image region corresponding to the first intermediate image data. In the second image processing, a predetermined filter may be applied to the image data of the input medical image data containing an outside of the image region corresponding to the first intermediate image data. The use of the predetermined filter in the second image processing corresponds to providing filtering feasible by known higher-speed processing (lighter-load processing) than the first image processing, such as using a denoise filter.

The k-spatial processing (processing on k-space) includes, for example, converting second intermediate image data to k-space data, performing k-spatial processing to the k-space data, and converting the resultant k-space data to output medical image data. The k-spatial processing may be implemented by, for example, zero filling interpolation as an example of interpolation on the k-space. Specifically, through the k-spatial processing, the second intermediate image data on the image space is converted to data on the k-space, i.e., k-space data. The second intermediate image data may be converted to k-space data by, for example, inverse Fourier transform. In the k-spatial processing, for example, a zero filling interpolation is performed to fill, with zeros, data in a predetermined region outside the outer edge of the k-space data. In the k-spatial processing, the resultant k-space data filled with zeros are then converted to output medical image data. The k-space data may be converted to the output medical image data by, for example, Fourier transform.

The k-spatial processing is not limited to filling the region outside the outer edge of the k-space data with zero values as described above. As an example, the k-spatial processing may include filtering of the k-space data on the k-space. Examples of such filtering include processing to the k-space data using a known filter such as a low-pass filter, a high-pass filter, and a Gaussian filter.

The processing circuitry 15 performs control of the medical image processing apparatus 1 as a whole. The processing circuitry 15 may be implemented by the processor or processors as described above. The processing circuitry 15 includes, for example, the obtaining function 151, the reconstruction function 153, the cropping function 155, the first image-processing function 156, the second image-processing function 157, and the third image-processing function 158. The processing circuitry 15 implementing the obtaining function 151, the reconstruction function 153, the cropping function 155, the first image-processing function 156, the second image-processing function 157, and the third image-processing function 158 corresponds to an obtainer unit, a reconstruction unit, a cropping unit, a first image-processing unit, a second image-processing unit, and a third image-processing unit, respectively. Each of the obtaining function 151, the reconstruction function 153, the cropping function 155, the first image-processing function 156, the second image-processing function 157, and the third image-processing function 158 is stored in computer-executable program format in the memory 13. The processing circuitry 15 is a processor or processors. For example, the processing circuitry 15 implements the functions corresponding to the computer programs by retrieving and executing the programs from the memory 13. In other words, having retrieved the respective programs, the processing circuitry 15 includes the obtaining function 151, the reconstruction function 153, the cropping function 155, the first image-processing function 156, the second image-processing function 157, and the third image-processing function 158.

The processing circuitry 15 uses the obtaining function 151 to obtain input medical image data which has been generated by the reconstruction function 153's applying the Fourier transform to MR data. Thus, the obtaining function 151 obtains the input medical image data by applying the Fourier transform to MR data. The input medical image data includes a larger image region than that of output medical image data resulting from the image processing by the third image-processing function 158, as described above. As illustrated in FIG. 2, for example, in the MRI apparatus 100 incorporating the processing circuitry 15, the obtaining function 151 obtains, as the input medical image data, a reconstructed MR image by the reconstruction function 153 from the reconstruction function 153. For another example, in the independent medical image processing apparatus 1 incorporating the processing circuitry 15 as illustrated in FIG. 1, the obtaining function 151 obtains, as the input medical image data, a medical image generated by the medical-image imaging apparatus 2 such as an MR apparatus from the medical-image imaging apparatus 2 or a medical image archiving apparatus such as a PACS via the communication interface 11. The obtaining function 151 may store the obtained input medical image data in the memory 13. The input medical image data may include a region or regions other than the image. Further, the overall region of the input medical image data and the image region of the second intermediate image data may not be the same in dimension and size.

The processing circuitry 15 uses the reconstruction function 153 to reconstruct, as input medical image data, an MR image based on the MR data. Specifically, the reconstruction function 153 generates the input medical image data by applying the Fourier transform to the MR data. The reconstruction function 153 stores the resultant input medical image data in the memory 13.

The processing circuitry 15 uses the cropping function 155 to extract from the input medical image data an image region including the region of the output medical image data and being smaller than the input medical image data, to generate first intermediate image data (first cropping). Specifically, the cropping function 155 determines, in the input medical image data, the region which may affect the image quality of the image region of the output medical image data when the first image processing is applied to the input medical image data, based on the parameter defining the first image processing, for example. The determined region is an image region smaller than the image region of the input medical image data. The cropping function 155 may determine such a region in accordance with a user input given via the input/output interface 17.

For example, when the first image-processing function 156 performs the first image processing including the distortion correction process, the cropping function 155 retrieves from the memory 13 the lookup table showing image distortions in the input medical image data relative to the image region of the output medical image data. The cropping function 155 uses the lookup table as the parameter defining the distortion correction process, to determine, as a region to be subject to the distortion correction process (hereinafter, a distortion correction region), the region which may affect the image quality of the output medical image data when the distortion correction process is applied to the input medical image data.

When the first image-processing function 156 performs the first image processing including the image-quality enhancement process, the cropping function 155 retrieves a kernel size for use in the image-quality enhancement process from the memory 13. The cropping function 155 uses the kernel size as the parameter defining the image-quality enhancement process, to determine, as a region to be subject to the image-quality enhancement process (hereinafter, an image-quality enhancement region), the region which may affect the image quality of the output medical image data when the image-quality enhancement process is applied to the input medical image data. For example, in the first image processing including both the image-quality enhancement process and the distortion correction process, the cropping function 155 determines the image-quality enhancement region based on the kernel size and the distortion correction region.

The processing circuitry 15 uses the cropping function 155 to extract, from the input medical image data, the determined region and to generate first intermediate image data. The cropping function 155 stores the first intermediate image data in the memory 13.

The processing circuitry 15 then uses the first image-processing function 156 to perform the first image processing to the first intermediate image data. The first image-processing function 156 generates processed data by the first image processing to the first intermediate image data. Thus, the first image-processing function 156 outputs the processed data to, for example, the memory 13.

The processing circuitry 15 uses the cropping function 155 to extract, from the input medical image data, image data containing an outside of an image region corresponding to the first intermediate image data (second cropping). The image data containing an outside of an image region corresponding to the first intermediate image data may overlap the outer periphery of the first intermediate image data, rather than containing only the outside of the image region corresponding to the first intermediate image data.

The processing circuitry 15 then uses the second image-processing function 157 to generate second intermediate image data by adding part of the input medical image data, i.e., the image data of the image region outside the image region corresponding to at least the first intermediate image data, to the first intermediate image data (processed data) having undergone the first image processing.

Specifically, the second image-processing function 157 generates second intermediate image data by combining or joining the extracted image data (after the second cropping) from the input medical image data with the outer edge of the processed data. Namely, the second image-processing function 157 generates second intermediate image data based on the first intermediate image data having undergone the first image processing and the image data of the input medical image data containing the outside of the image region corresponding to the first intermediate image data.

In addition, the processing circuitry 15 may use the second image-processing function 157 to apply a predetermined filter to the extracted image data (after the second cropping) from the input medical image data. In this case the second image-processing function 157 generates second intermediate image data by adding, to the outer edge of the processed data, the image data filtered with the predetermined filter in the second image processing. The second image-processing function 157 stores the resultant second intermediate image data in the memory 13. The data to be added to the processed data may be referred to as additional data.

The processing circuitry 15 uses the third image-processing function 158 to convert the second intermediate image data to k-space data. The third image-processing function 158 then performs k-spatial processing to the resultant k-space data. As an example of the k-spatial processing, the third image-processing function 158 performs filtering of the k-space data or fills an outside of the outer edge of the k-space data with zero values. The third image-processing function 158 then converts the k-space data having undergone the k-spatial processing to output medical image data. The third image-processing function 158 outputs the output medical image data to a display included in the input/output interface 17. The image processing that the third image-processing function 158 performs may be referred to as third image processing. The processing circuitry 15 further uses the third image-processing function 158 to output the output medical image data to the memory 13 and/or the storage 125. The third image-processing function 158 also outputs the output medical image data to the medical image archiving apparatus as a PACS via the communication interface 11 and the network. In addition, the third image-processing function 158 may output the output medical image data to various kinds of servers installed inside and/or outside the hospital via the communication interface 11 and the network.

Figure 3:
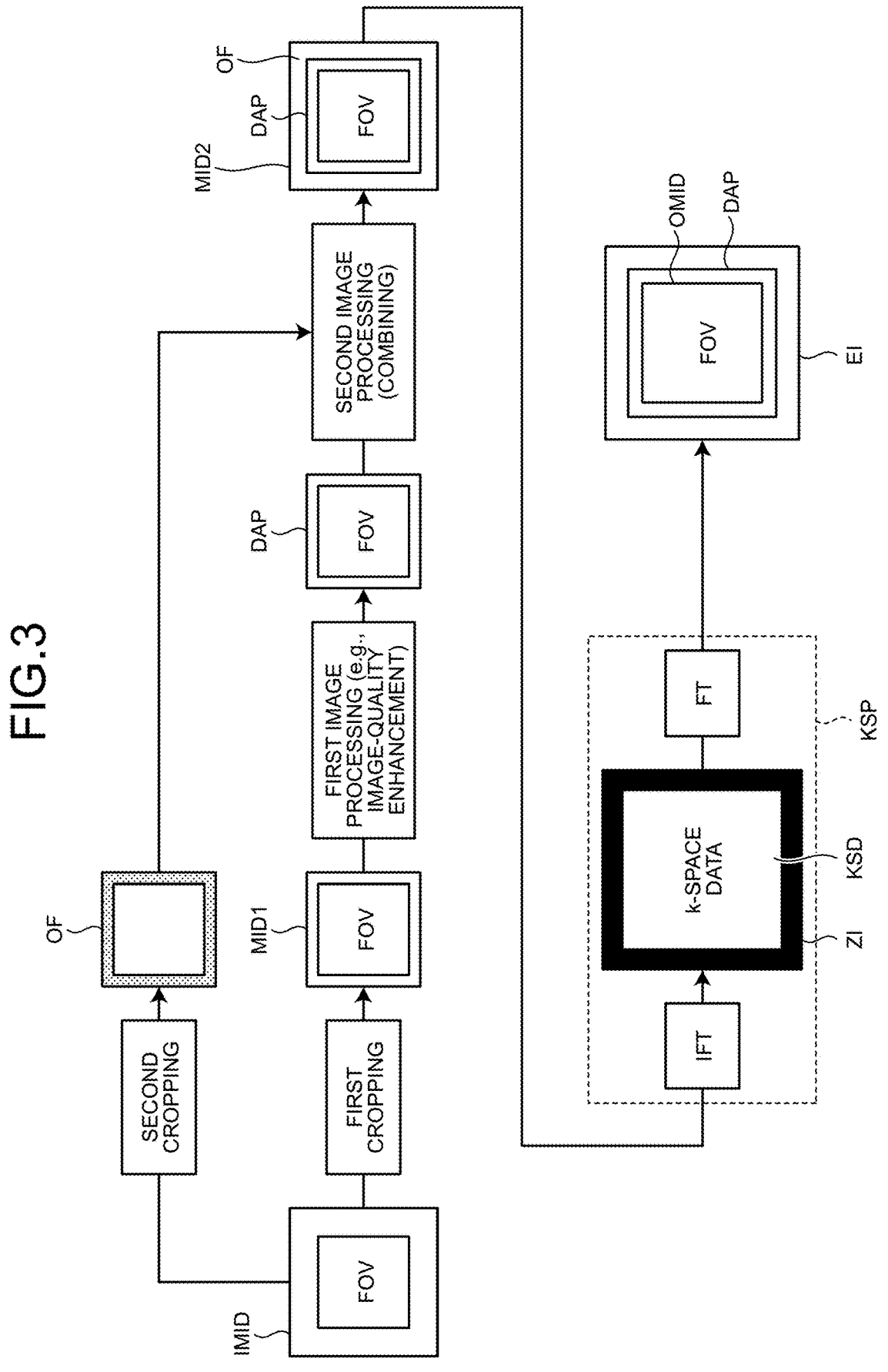
FIG. 3 illustrates an example of an outline of image processing according to an embodiment.

The steps of the image processing to be performed by the MRI apparatus 100 or the medical image processing apparatus 1 as configured above according to the present embodiment will be explained with reference to FIGS. 3 and 4. FIG. 3 illustrates an outline of the image processing by way of example. FIG. 4 is a flowchart illustrating an example of the image processing steps.

As illustrated in FIG. 3, the processing circuitry 15 uses the cropping function 155 to generate first intermediate image data MID1 by performing cropping (first cropping) of input medical image data IMID based on the region to be subject to the first image processing. As illustrated in FIG. 3, the image region of the input medical image data IMID is larger in size than the FOV as a subject of the image processing. When the first image processing is performed by a CNN, the first intermediate image data MID1 corresponds to the region that may affect CNN outputs. The processing circuitry 15 then uses the first image-processing function 156 to perform the first image processing (e.g., image-quality enhancement process) to the first intermediate image data MID1, as illustrated in FIG. 3.

As illustrated in FIG. 3, the processing circuitry 15 uses the second image-processing function 157 to extract, from the input medical image data IMID, image data OF containing an outside of an image region corresponding to the first intermediate image data MID1 (second cropping). In addition, the second image-processing function 157 may apply a predetermined filter to the image data OF. The filtering is defined to be lighter-load processing than the first image processing.

Next, the processing circuitry 15 uses the second image-processing function 157 to generate second intermediate image data MID2 by adding (combining) the image data OF to processed data DAP.

Namely, the processing circuitry 15 uses the second image-processing function 157 to generate second intermediate image data MID2 based on the image data OF of the input medical image data MID1 containing the outside of the image region corresponding to the first intermediate image data MID1 and on the first intermediate image data DAP having undergone the first image processing. Specifically, the second image-processing function 157 generates the second intermediate image data MID2 by extracting the image data OF containing the outside of the image region corresponding to the first intermediate image data from the input medical image data IMID and adding the image data OF containing the outside to the outer edge of the first intermediate image data (processed data) DAP having undergone the first image processing. Thus, the second image-processing function 157 combines the image data OF and the first intermediate image data DAP having undergone the first image processing to generate the second intermediate image data MID2, as illustrated in FIG. 3. Alternatively, the second image-processing function 157 may generate the second intermediate image data MID2 by applying a predetermined filter to the image data OF containing the outside of the image region corresponding to the first intermediate image data and combining the resultant image data OF and the first intermediate image data DAP having undergone the first image processing.

In the second cropping, the image data OF containing the outside of the image region corresponding to the first intermediate image data and the first intermediate image data DAP having undergone the first image processing may have an overlapping region. For example, the processing circuitry 15 may use the second image-processing function 157 to extract the image data OF from the input medical image data IMID through the second cropping such that the image data OF overlaps an end region of the image region corresponding to the first intermediate image data MID1. In this case the second image-processing function 157 generates the second intermediate image data MID2 by performing averaging or weighted averaging of the image data OF containing the outside of the image region corresponding to the first intermediate image data and the first intermediate image data DAP having undergone the first image processing in the overlapping region between the first intermediate image data MID1 and the image data OF.

As illustrated in FIG. 3, the processing circuitry 15 uses the third image-processing function 158 to generate k-space data KSD by applying inverse Fourier transform IFT to the second intermediate image data MID2. The third image-processing function 158 performs k-spatial processing KSP (e.g., zero filling interpolation ZI) to the k-space data KSD and applies Fourier transform FT to the resultant k-space data to generate output medical image data OMID for output. When the zero filling interpolation ZI is performed, the output medical image data OMID is output as an enlarged image EI.

Image Processing

Step S401

The imaging control circuitry 121 performs magnetic resonance imaging of the subject P to acquire MR data. The imaging control circuitry 121 transfers the MR data to the medical image processing apparatus 1 and/or the storage 125. In the medical image processing apparatus 1 that independently performs the image processing, as illustrated in FIG. 1, however, the obtaining function 151 obtains the MR data at step S401 of the flowchart.

Step S402

The processing circuitry 15 uses the reconstruction function 153 to apply the Fourier transform FT to the MR data. In other words, the reconstruction function 153 reconstructs input medical image data IMID from the MR data. This allows the obtaining function 151 to obtain the input medical image data IMID. In the medical image processing apparatus 1 that independently performs image processing and includes no reconstruction function 153, as illustrated in FIG. 1, the operation at step S401 is omissible. In this case the obtaining function 151 obtains the input medical image data IMID reconstructed by the MRI apparatus from the MRI apparatus.

Step S403

The processing circuitry 15 uses the obtaining function 151 to obtain a parameter defining the first image processing to be applied to the input medical image data IMID from the memory 13. The parameter defining the first image processing represents the specifics of the image processing. In the image processing being the distortion correction process (GDC), the parameter represents the above-described lookup table. In the image processing being the image-quality enhancement process where the noise reduction process and/or the artifact reduction process are implemented by the filter, the parameter represents the above-described filter kernel. In the image processing being the image-quality enhancement process where the noise reduction process and/or the artifact reduction process are implemented by the trained model (e.g., a CNN), the parameter represents the convolution kernel and the number of the convolution layers.

Step S404

The processing circuitry 15 uses the cropping function 155 to generate first intermediate image data MID1 based on the parameter defining the first image processing and the input medical image data IMID. The cropping function 155 generates first intermediate image data MID1 by performing the first cropping of the input medical image data IMID using the region to be subject to the first image processing defined by the parameter. In the first image processing being the distortion correction process, for example, the cropping function 155 generates first intermediate image data MID1 by adding the distortion correction region in the input medical image data IMID to the FOV, with reference to the lookup table. In the first image processing being the image-quality enhancement process where the trained model (e.g., a CNN) implements the noise reduction process and/or the artifact reduction process, the cropping function 155 generates first intermediate image data MID1 by adding the image-quality enhancement region to the FOV based on the convolution kernel and the number of the convolution layers. In the first image processing including both the distortion correction process and the image-quality enhancement process, the cropping function 155 generates first intermediate image data MID1 by adding the image-quality enhancement region to the FOV based on the distortion correction region, the convolution kernel, and the number of the convolution layers.

Step S405

The processing circuitry 15 uses the first image processing function 156 to perform the first image processing to the first intermediate image data MID1. Thus, the first image-processing function 156 generates processed data DAP by the first image processing.

Step S406

The processing circuitry 15 uses the cropping function 155 to extract image data of an image region different from the first intermediate image data from the input medical image data IMID. Namely, the processing circuitry 15 uses the cropping function 155 to extract image data OF from the input medical image data IMID (second cropping), the image data OF containing an outside of the image region corresponding to the first intermediate image data DAP. In this case, the cropping function 155 may extract the image data OF from the input medical image data IMID through the second cropping such that the image data OF overlaps an end region of the image region corresponding to the first intermediate image data MID1.

Step S407

The processing circuitry 15 uses the second image-processing function 157 to generate second intermediate image data MID2 by adding (combining) the image data OF extracted from the input medical image data IMID to the first intermediate image data (processed data DAP) having undergone the first image processing. Thus, the second image-processing function 157 adds the image data OF to the outer edge of the first intermediate image data (processed data DAP) having undergone the first image processing to generate second intermediate image data MID2. In this case, the second image-processing function 157 may generate the second intermediate image data MID2 by adding the image data OF to the outer edge of the processed data DAP in such a manner that the resultant image data MID2 matches the image region of the input medical image data IMID.

In other words, the processing circuitry 15 uses the second image-processing function 157 to generate the second intermediate image data MID2 based on the image data OF of the input medical image data IMID containing the outside of the image region corresponding to the first intermediate image data MID1 and on the first intermediate image data DAP having undergone the first image processing. For example, the second image-processing function 157 generates the second intermediate image data MID2 by adding the image data OF containing the outside to the outer edge of the first intermediate image data DAP having undergone the first image processing.

Alternatively, the second image-processing function 157 may generate the second intermediate image data MID2 based on the first intermediate image data DAP having undergone the first image processing and on the image data resulting from applying a predetermined filter to the image data OF containing the outside of the image region corresponding to the first intermediate image data MID1.

For another example, the second image-processing function 157 may set a margin between the image data OF and the first intermediate image having undergone the first image processing (processed data DAP) to perform weighted averaging of the margin to smoothly connect the image data OF and the first intermediate image having undergone the first image processing. Then, the image data OF may be added to the outer edge of the first intermediate image data having undergone the first image processing (processed data DAP).

In the second cropping, when the image data OF containing the outside of the image region corresponding to the first intermediate image data MID1 and the first intermediate image data DAP having undergone the first image processing have an overlapping region, the processing circuitry 15 may use the second image-processing function 157 to generate the second intermediate image data MID2 by performing averaging or weighted averaging of the image data OF and the first intermediate image data DAP having undergone the first image processing in the overlapping region. Weights of the weighted averaging in the overlapping region are set, for example, such that the closer to the center of the first intermediate image data MID1 the position concerned is, the smaller the weight set for the image data OF is and the larger the weight set for the first intermediate image data DAP is.

Step S408

The processing circuitry 15 uses the third image-processing function 158 to convert the second intermediate image data MID2 to k-space data KSD by the inverse Fourier transform IFT. The third image-processing function 158 then performs k-spatial processing KSP to the k-space data KSD. In the example of FIG. 3, the third image-processing function 158 performs zero filling interpolation ZI as the k-spatial processing.

Step S409

The processing circuitry 15 uses the third image-processing function 158 to convert the k-space data KSD having undergone the k-spatial processing KSP to generate output medical image data OMID. Examples of this conversion include the Fourier transform.

Step S410

The processing circuitry 15 uses the third image-processing function 158 to output the output medical image data OMID generated by the Fourier transform FT after the k-spatial processing. For example, the third image-processing function 158 outputs the output medical image data OMID to the display of the input/output interface 17. As illustrated in FIG. 1, in the medical image processing apparatus 1 which independently implements the image processing, the third image-processing function 158 outputs the output medical image data OMID to the medical image archiving apparatus as a PACS or a viewer via the communication interface 11 and the network. This completes the image processing of the present embodiment.

The following will describe a first comparison and a second comparison by way of example, in view of presenting the significant effects of the present embodiment.

First Comparison

FIG. 5 illustrates an outline of image processing according to the first comparison by way of example. The first comparison in FIG. 5 differs from FIG. 3 in not performing the combining process (second image processing) to combine the image data OF, i.e., the image region corresponding to the frame outside the first intermediate image data MID1. Because of this, according to the first comparison, the k-spatial processing KSP may result in occurrence of wraparound artifacts and Gibbs artifacts in the FOV corresponding to the output medical image data OMID.

Second Comparison

Figure 6:
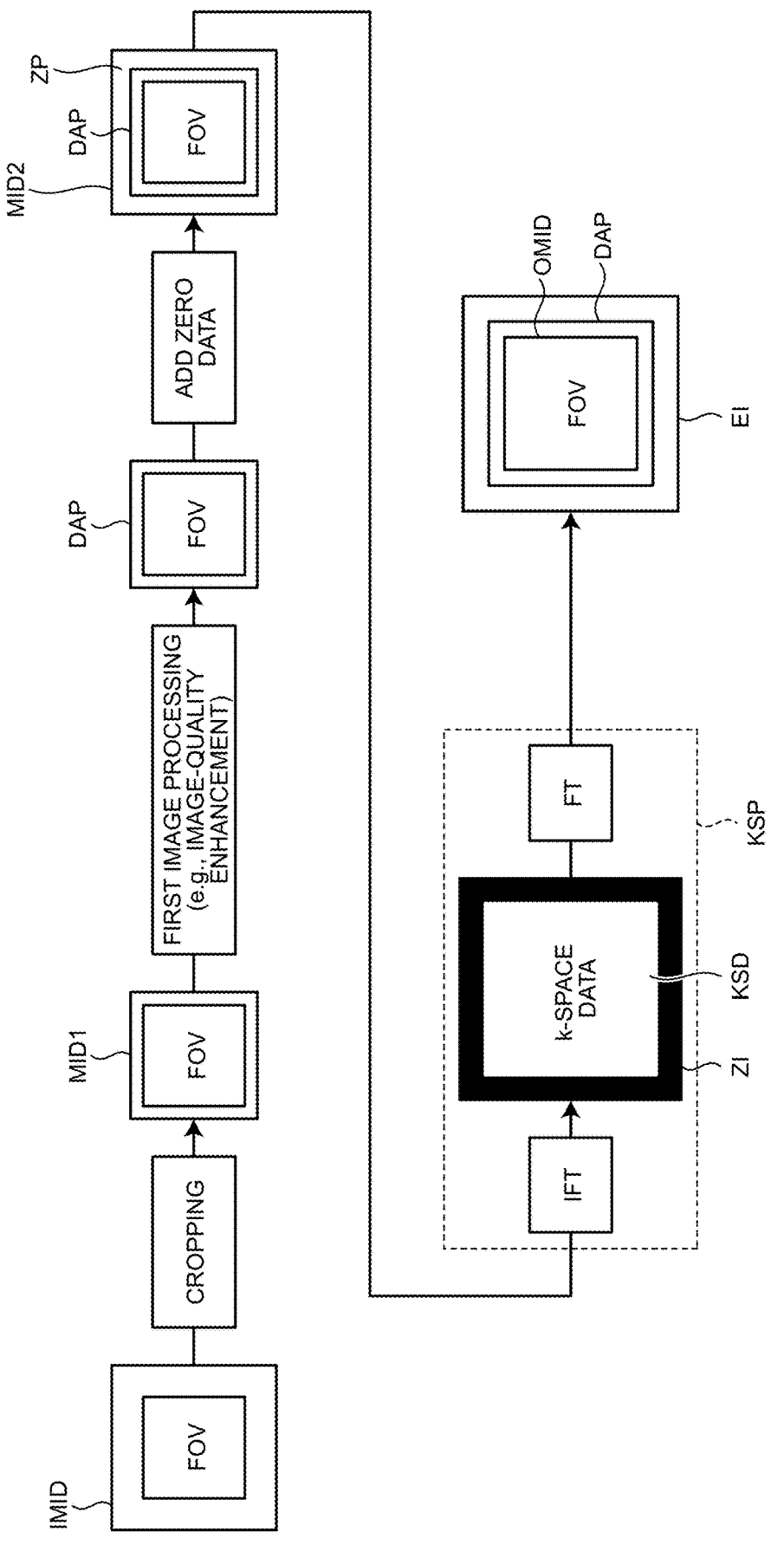
FIG. 6 illustrates an example of an outline of image processing according to a second comparison relative to an embodiment.

FIG. 6 illustrates an outline of image processing according to the second comparison by way of example. The second comparison in FIG. 6 differs from FIG. 3 in adding zero data in place of combining the image data OF with the intermediate image data MID1. The addition of zero data is intended to maintain the enlargement factor of the FOV in the image enlargement process, for example. According to the second comparison, data ZP to be added to the processed data DAP is data with zero values. In the second comparison, thus, wraparound artifacts will not appear due to the k-spatial processing KSP in the FOV corresponding to the output medical image data OMID. In the second comparison, however, Gibbs artifacts may occur due to signal differences between a part of the processed data DAP (e.g., a denoised part) and the part filled with zero data, that is, signal differences at the boundary between the processed data DAP and the data ZP added to the processed data DAP.

In magnetic resonance imaging, for example, a larger region than an FOV of interest may be captured for the purpose of reducing wraparound artifacts, and then only the region that is to affect an output may be subjected to noise removal through heavy-load, time-consuming processing (e.g., image-quality enhancement process) such as CNN in view of reducing computational load (hereinafter, computational-load reducing process). Further, the k-spatial processing KSP such as a FOV enlargement process may be added as post-processing (hereinafter, k-spatial post processing). In such a case wraparound artifacts and Gibbs artifacts may occur in the FOV by the first comparative method. Meanwhile, no wraparound artifacts may occur but Gibbs artifacts may appear in the FOV by the second comparative method.

According to the embodiments as above, the MRI apparatus 100 and the medical image processing apparatus 1 obtain input medical image data IMID having a larger image region than the image region of output medical image data (FOV) resulting from image processing; generate first intermediate image data MID1 by extracting from the input medical image data IMID an image region including a region in the output medical image data (FOV) and being smaller than the image region of the input medical image data IMID; perform first image processing to the first intermediate image data MID1; generate second intermediate image data MID2 based on the first intermediate image data DAP having undergone the first image processing and on image data, of the input medical image data, containing an outside of an image region corresponding to the first intermediate image data MID1; and convert the second intermediate image data MID2 to k-space data KSD, perform k-spatial processing KSP to the k-space data KSD, and convert the k-space data having undergone the k-spatial processing KSP to output medical image data OMID.

According to another embodiment, the MRI apparatus 100 and the medical image processing apparatus 1 generate the first intermediate image data MID1 based on a region that is to affect image quality of an image region of image data resulting from the first image processing applied to the overall image region of the input medical image data. According to another embodiment, the MRI apparatus 100 and the medical image processing apparatus 1 perform, as the k-spatial processing KSP, filtering of the k-space data KSD or zero filling processing (zero filling interpolation) to an outside of the outer edge of the k-space data.

Further, according to another embodiment, the MRI apparatus 100 and the medical image processing apparatus 1 extract, from the input medical image data IMID, the image data OF containing the outside of the image region corresponding to the first intermediate image data MID1, and generate the second intermediate image data MID2 by adding the image data OF containing the outside of the image region corresponding to the first intermediate image data MID1 to the outer edge of the first intermediate image data DAP having undergone the first image processing. Alternatively, according to another embodiment, the MRI apparatus 100 and the medical image processing apparatus 1 may generate the second intermediate image data MID2 based on image data resulting from applying a predetermined filter to the image data OF containing the outside and on the first intermediate image data DAP having undergone the first image processing.

Figure 7:
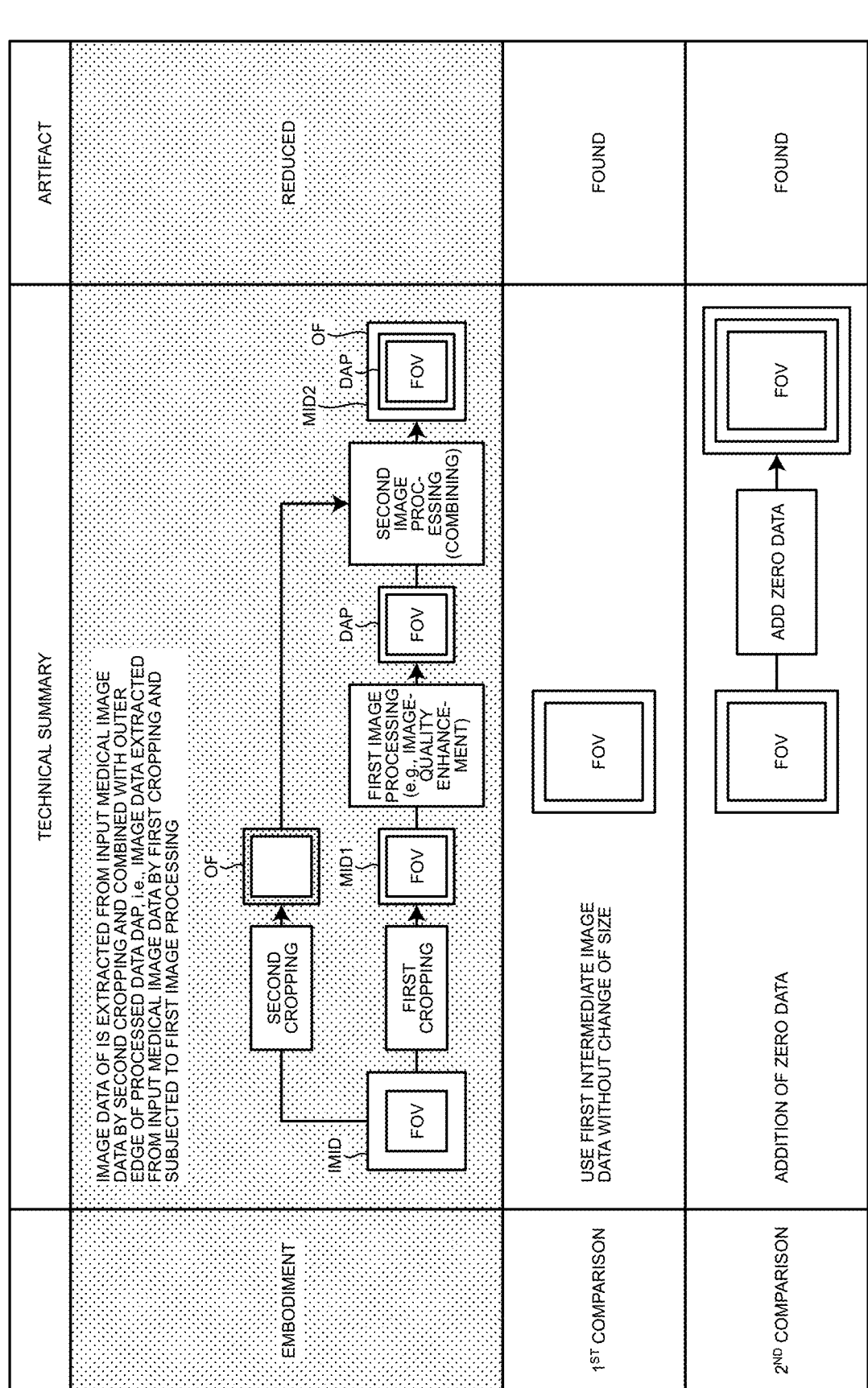
FIG. 7 is a list showing technical summaries and a state of artifacts among the first comparison, the second comparison, and one embodiment.

FIG. 7 is a list showing the technical summaries of the first comparison, the second comparison, and the present embodiment and a state of artifacts. According to the present embodiment, as illustrated in FIG. 7, the image data OF is extracted from the input medical image data IMID by the second cropping and combined with the outer edge of the processed data DAP, i.e., image data extracted from the input medical image data IMID by the first cropping and subjected to the first image processing. In this manner the present embodiment can reduce wraparound artifacts, unlike the first comparison. Moreover, as compared with the second comparison, the present embodiment can reduce the signal differences between the processed data DAP (e.g., denoised part) and the image data OF, i.e., the signal differences at the boundary between the processed data DAP and the image data OF added to the processed data DAP, thereby reducing Gibbs artifacts.

Figure 8:
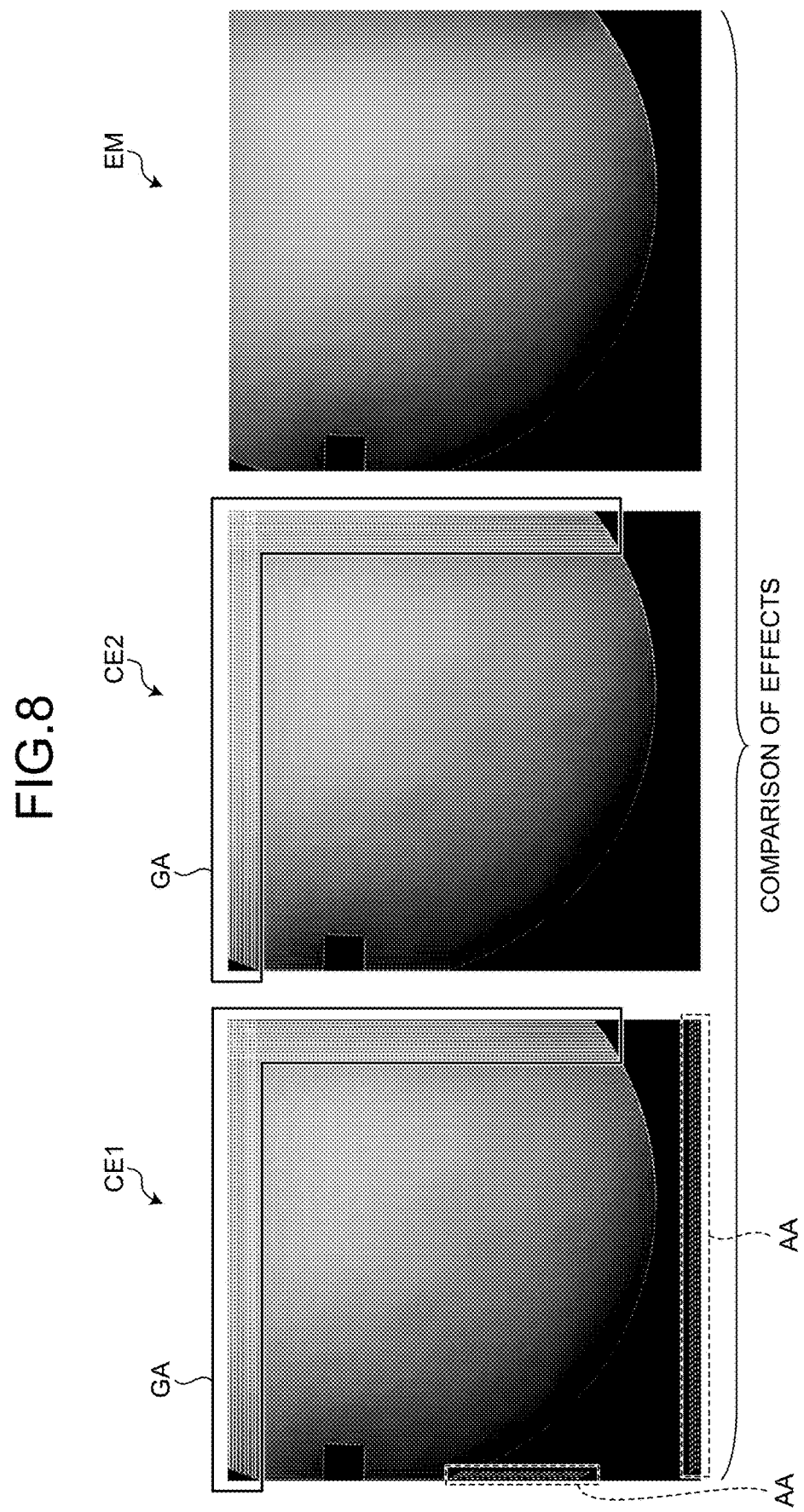
FIG. 8 illustrates advantageous effects of one embodiment over the first comparison and the second comparison.

FIG. 8 depicts the significant effects of the present embodiment with respect to the first comparison and the second comparison (comparison of effects), by way of example. As shown in FIG. 8, Gibbs artifacts GA and wraparounds artifacts AA appear in a medical image CE1 based on the first comparison. Further, as shown in FIG. 8, Gibbs artifacts GA appear in a medical image CE2 based on the second comparison although wraparounds artifacts AA are reduced. Meanwhile, it can be seen from FIG. 8 that both Gibbs artifacts GA and wraparounds artifacts AA are reduced in output medical image data EM based on the present embodiment.

According to the MRI apparatus 100 and the medical image processing apparatus 1 of one embodiment, the image data OF containing the outside of the image region corresponding to the first intermediate image data MID1 and the first intermediate image data DAP having undergone the first image processing may have an overlapping region. In this case the MRI apparatus 100 and the medical image processing apparatus 1 of one embodiment generate the second intermediate image data MID2 by performing averaging or weighted averaging of the image data OF containing the outside of the image region corresponding to the first intermediate image data MID1 and the first intermediate image data DAP having undergone the first image processing in the overlapping region. This makes it possible for the MRI apparatus 100 and the medical image processing apparatus 1 of one embodiment to reduce differences in brightness at the boundary (i.e., unnaturally rendered edge) between the outside region (image data OF) with more noise than the FOV and the denoised region DAP inside the input medical image data IMID. Consequently, the MRI apparatus 100 and the medical image processing apparatus 1 of one embodiment can generate naturally rendered, enlarged images EI with less computational load while reducing artifacts appearing in the FOV.

As such, at the time of performing the k-spatial post-processing following the computational-load reducing process, the MRI apparatus 100 and the medical image processing apparatus 1 of one embodiment can add the image data OF of the input medical image data IMID containing the outside of the image region corresponding to the first intermediate image data MID1, to the outside of the processed data DAP (e.g., denoised image through the first image processing). In this manner the MRI apparatus 100 and the medical image processing apparatus 1 of one embodiment can abate artifacts as compared with the first comparison and the second comparison, as shown in FIG. 7 and FIG. 8. In other words, the MRI apparatus 100 and the medical image processing apparatus 1 of one embodiment can reduce artifacts appearing in the FOV while decreasing the computational load.

To implement the technical idea of one embodiment by a medical image processing method, the medical image processing method includes obtaining input medical image data IMID having a larger image region than an image region of output medical image data OMID (FOV) resulting from image processing; generating first intermediate image data MID1 by extracting from the input medical image data IMID an image region including a region (FOV) in the output medical image data OMID and being smaller than the image region of the input medical image data IMID; performing first image processing to the first intermediate image data MID1; generating second intermediate image data MID2 based on the first intermediate image data DAP having undergone the first image processing and on image data OF, of the input medical image data IMID, containing an outside of an image region corresponding to the first intermediate image data MID1; and converting the second intermediate image data MID2 to k-space data KSD, performing k-spatial processing KSP to the k-space data KSD, and converting the k-space data having undergone the k-spatial processing KSP to the output medical image data OMID. The procedure and effects of the medical image processing performed by the image processing method are similar to or the same as those of the embodiments, therefore, a description thereof is omitted herein.

To implement the technical idea of one embodiment by a medical image processing program, the medical image processing program causes the computer to perform obtaining input medical image data IMID having a larger image region than an image region of output medical image data OMID (FOV) resulting from image processing; generating first intermediate image data MID1 by extracting from the input medical image data IMID an image region including a region (FOV) in the output medical image data OMID and being smaller than the image region of the input medical image data IMID; performing first image processing to the first intermediate image data MID1; generating second intermediate image data MID2 based on the first intermediate image data DAP having undergone the first image processing and on image data OF, of the input medical image data IMID, containing an outside of an image region corresponding to the first intermediate image data MID1; and converting the second intermediate image data MID2 to k-space data KSD, performing k-spatial processing KSP to the k-space data KSD, and converting the k-space data having undergone the k-spatial processing KSP to the output medical image data OMID. The medical image processing program may be stored in, for example, a computer-readable, nonvolatile storage medium.

As an example, the medical image processing program may be installed in any of various kinds of image processing servers (processing apparatus) from the nonvolatile storage medium, and loaded on the memory to be able to implement the image processing. In this case the program for causing the computer to execute the image processing can be stored and distributed in a storage medium such as a magnetic disk (e.g., hard disk), an optical disk (e.g., CD-ROM, DVD), or a semiconductor memory. The procedure and effects of the medical image processing program are similar to or the same as those in the embodiments, therefore, a description thereof is omitted herein.

According to at least one of the embodiments described above, it is possible to reduce artifacts.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus comprising processing circuitry configured to:

obtain input medical image data having a larger image region than an image region of output medical image data resulting from image processing, generate first intermediate image data by extracting from the input medical image data an image region including a region in the output medical image data and being smaller than the image region of the input medical image data, perform first image processing to the first intermediate image data, generate second intermediate image data based on:

image data, of the input medical image data, containing an outside of an image region corresponding to the first intermediate image data, and the first intermediate image data having undergone the first image processing, and convert the second intermediate image data to k-space data, perform k-spatial processing to the k-space data, and convert the k-space data having undergone the k-spatial processing to the output medical image data.

2. The medical image processing apparatus according to claim 1, wherein the processing circuitry is further configured to perform, as the k-spatial processing, filtering of the k-space data or zero filling processing to an outside of an outer edge of the k-space data.

3. The medical image processing apparatus according to claim 1, wherein the processing circuitry is further configured to:

extract the image data containing the outside from the input medical image data, and generate the second intermediate image data by adding the image data containing the outside to an outer edge of the first intermediate image data having undergone the first image processing.

4. The medical image processing apparatus according to claim 1, wherein the processing circuitry is further configured to generate the second intermediate image data based on:

image data resulting from applying a predetermined filter to the image data containing the outside, and the first intermediate image data having undergone the first image processing.

5. The medical image processing apparatus according to claim 1, wherein the image data containing the outside and the first intermediate image data having undergone the first image processing have an overlapping region, and the processing circuitry is further configured to generate the second intermediate image data by performing averaging or weighted averaging of the image data containing the outside and the first intermediate image data having undergone the first image processing in the overlapping region.

6. The medical image processing apparatus according to claim 1, wherein the processing circuitry is further configured to generate the first intermediate image data based on a region that is to affect image quality of an image region of image data resulting from applying the first image processing to an overall image region of the input medical image data.

7. A magnetic resonance imaging apparatus comprising:

imaging control circuitry configured to perform magnetic resonance imaging of a subject to acquire magnetic resonance (MR) data; and processing circuitry configured to:

apply Fourier transform to the MR data to obtain input medical image data having a larger image region than an image region of output medical image data resulting from image processing, generate first intermediate image data by extracting from the input medical image data an image region including a region in the output medical image data and being smaller than the image region of the input medical image data, perform first image processing to the first intermediate image data, generate second intermediate image data based on:

image data, of the input medical image data, containing an outside of an image region corresponding to the first intermediate image data, and the first intermediate image data having undergone the first image processing, and convert the second intermediate image data to k-space data, perform k-spatial processing to the k-space data, and convert the k-space data having undergone the k-spatial processing to the output medical image data.

8. A medical image processing method comprising:

obtaining input medical image data having a larger image region than an image region of output medical image data resulting from image processing;

generating first intermediate image data by extracting from the input medical image data an image region including a region in the output medical image data and being smaller than the image region of the input medical image data;

performing first image processing to the first intermediate image data;

generating second intermediate image data based on:

image data, of the input medical image data, containing an outside of an image region corresponding to the first intermediate image data, and the first intermediate image data having undergone the first image processing; and converting the second intermediate image data to k-space data, performing k-spatial processing to the k-space data, and converting the k-space data having undergone the k-spatial processing to the output medical image data.

* * * * *